(12) United States Patent
Wächtler et al.

(10) Patent No.: US 12,352,310 B2
(45) Date of Patent: Jul. 8, 2025

(54) PLASTIC CAGE, IN PARTICULAR FOR AN INNER-RING-FASTENED ROLLER SLEEVE

(71) Applicant: Schaeffler Technologies AG & Co. KG, Herzogenaurach (DE)

(72) Inventors: Stefan Wächtler, Herzogenaurach (DE); Robert Dressel, Gremsdorf (DE); Alfred Hock, Höchstadt/Aisch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 74 days.

(21) Appl. No.: 18/249,092

(22) PCT Filed: Sep. 8, 2021

(86) PCT No.: PCT/DE2021/100741
§ 371 (c)(1),
(2) Date: Apr. 14, 2023

(87) PCT Pub. No.: WO2022/078543
PCT Pub. Date: Apr. 21, 2022

(65) Prior Publication Data
US 2023/0392648 A1    Dec. 7, 2023

(30) Foreign Application Priority Data
Oct. 16, 2020    (DE) .......................... 102020127283.9

(51) Int. Cl.
*F16C 33/46*    (2006.01)
(52) U.S. Cl.
CPC ................................ *F16C 33/4694* (2013.01)

(58) Field of Classification Search
CPC .. F16C 33/4694; F16C 33/46; F16C 33/4652; F16C 33/502; F16C 33/504; F16C 33/3812; F16C 33/3875; F16C 33/3856; F16C 33/4635
See application file for complete search history.

(56) References Cited

U.S. PATENT DOCUMENTS 4,239,304 A  * 12/1980  Wakunami ............ F16C 33/504
                                                              384/573
4,397,507 A      8/1983  Kraus et al.
(Continued)

FOREIGN PATENT DOCUMENTS

| DE | 19513668 A1 | 10/1996 |
|----|----|----|
| DE | 102011007458 A1 | 10/2012 |
| DE | 102012021687 A1 | 5/2014 |

(Continued)

*Primary Examiner* — John Olszewski
*Assistant Examiner* — Aimee Tran Nguyen
(74) *Attorney, Agent, or Firm* — Price Heneveld LLP

(57) ABSTRACT

A plastic cage consists of two side rings that have a common axis of rotation and are axially spaced apart from one another, and a plurality of cage webs that connect the side rings to one another and between which pockets are formed for receiving rolling elements, wherein the plastic cage is axially slotted at at least one peripheral location by a parting line which defines a first cage end and a second cage end and at the boundary surfaces of which mutually corresponding closure elements are located, by means of which the first and second cage ends can be fixed relative to one another both in the axial and radial direction and in the peripheral direction.

11 Claims, 1 Drawing Sheet

(56) References Cited

U.S. PATENT DOCUMENTS 4,865,473 A * 9/1989 De Vito .............. F16C 33/4694
                                                          384/577
2016/0123392 A1    5/2016 Steblau

FOREIGN PATENT DOCUMENTS

| DE | 102014222096 A1 |   | 5/2016  |             |
|----|-----------------|---|---------|-------------|
| DE | 102017212688 A1 |   | 1/2019  |             |
| FR |     2918136 A1  | * | 1/2009  | F16C 33/4635 |
| JP |      0276222 U  |   | 6/1990  |             |
| JP |     10281165 A  |   | 10/1998 |             |

* cited by examiner

PLASTIC CAGE, IN PARTICULAR FOR AN INNER-RING-FASTENED ROLLER SLEEVE

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/ 2021/100741, filed on Sep. 8, 2021, designating the United States of America, which in turn claims the benefit of priority under 35 U.S.C. §§ 119, 365 of German Patent Application No. 102020127283.9, filed Oct. 16, 2020, the contents of which are relied upon and incorporated herein by reference in their entirety.

FIELD OF THE DISCLOSURE

The disclosure relates to a plastic cage, which can be used particularly advantageously for inner-ring-fastened roller sleeves for supporting hollow shafts, gear wheels or planet carriers in motor vehicle manual transmissions.

BACKGROUND OF THE DISCLOSURE

In rolling bearing technology, it is generally known that roller sleeves have the radial roller bearing design with the smallest radial height and enable particularly space-saving and easy-to-assemble bearings with a high radial load-bearing capacity. The best-known and most frequently used design is the housing- or outer-ring-fastened roller sleeve known from DE 195 13 668 A1, for example, which consists of an outer ring that can be inserted into a housing and a roller-and-cage assembly which is inserted into this outer ring and which is formed by an axially slotted bearing cage made of plastic without a cage lock and made of a plurality of roller-type rolling elements inserted into this bearing cage, which roll on an outer track formed by the inner lateral surface of the outer ring, wherein the roller-and-cage assembly is axially guided by means of two flanges arranged on the axial sides of the outer ring and extending radially inwards.

An inverse design to this outer-ring-fastened roller sleeve is the shaft- or inner-ring-fastened roller sleeve known, for example, from documents DE 10 2011 007 458 A1 and DE 10 2012 021 687 A1, which, like an outer-ring-fastened roller sleeve, consists of an inner ring fastened on a shaft or axle and a roller-and-cage assembly arranged on this inner ring, which is formed by a bearing cage consisting of two side rings and a plurality of connecting webs as well as a plurality of roller-type rolling elements which are inserted into this bearing cage and which are retained by the bearing cage at regular intervals in the peripheral direction and roll on an inner track formed by the outer lateral surface of the inner ring. In this design too, the roller-and-cage assembly is guided axially by two flanges of the same length arranged on the axial sides of the inner ring, which in this case extend radially outwards.

However, a disadvantage of this design of roller sleeve has been found to be that it is not possible to use an inexpensive, axially slotted bearing cage made of plastic without a cage lock, as is the case with outer-ring-fastened roller sleeves, as the ends of the bearing cage are not supported by the outer ring, as is the case with outer-ring-fastened roller sleeves. When assembling transmission parts supported on inner-ring-fastened roller sleeves, it is therefore possible that the ends of a plastic bearing resting loosely against one another fall out of the inner ring due to the force of gravity, causing problems during transmission assembly due to the cage ends blocking the installation space of the transmission parts.

A possible solution to this problem would be to use a closed bearing cage made of sheet steel, which is then inserted into the inner ring before the second flange is flanged and, after the second flange is flanged, is subjected to the necessary heat treatment together with the inner ring. For this, however, the increased manufacturing and material costs for the production of the inner-ring-fastened roller sleeve would have to be accepted.

Another possibility for solving the problem described would be to design the open plastic cage such that it can be closed with a cage lock, as is known, for example, from DE 10 2014 222 096 A1 or from DE 10 2017 212 688 A1. The disclosed plastic cages each consist of two side rings which have a common axis of rotation and are axially spaced apart from one another, as well as a plurality of cage webs connecting the side rings to one another, between which pockets are formed to accommodate rolling elements. At at least one point on the circumference, the plastic cage is designed to be axially slotted by a parting line which defines a first and a second cage end and at the boundary surfaces of which mutually corresponding closure elements are arranged, with which the cage ends can be fixed to one another both in the axial and radial direction as well as in the peripheral direction.

In practice, however, it has been shown that the known forms of cage locks are unsuitable for applications on plastic cages in inner-ring-fastened roller sleeves with large diameters and narrow widths due to the small cage width, or that none of these cage locks has proved durable enough for the requirements present in a transmission.

Based on the above-mentioned disadvantages, the disclosure is therefore based on the object of producing a plastic cage designed to be axially slotted by a parting line, the cage lock of which is suitable for use on inner-ring-fastened roller sleeves with large diameters and narrow widths.

SUMMARY OF THE DISCLOSURE

According to an aspect of the present disclosure, a plastic cage includes a parting line that runs radially centrally through a tangentially widened cage web and the closure elements are each formed by a projection molded onto each boundary surface of the parting line as an extension of the outer lateral surface of the cage web, which is axially spaced from the side rings with a latch which points radially inwards into the cage at its free end, to which a projection molded onto each boundary surface of the parting line as an extension of the inner lateral surface of the cage web and also axially spaced from the side rings is assigned opposite it in the peripheral direction, with a latch pointing radially outwards from the cage at its free end, wherein one of the latches pointing outwards from the cage additionally has an axial extension for axially fixing the cage ends, which is connected to a tangential extension of the adjacent side ring.

According to another aspect of the present disclosure, the projections at both boundary surfaces of the parting line have a tangential length which corresponds to at least twice the profile width of their latches. The design of the projections with such a length has the background that the connection of the cage ends by latching of the latches of one cage end behind the latches of the other cage end thereby has little or no tangential play. The end surfaces of the latches rest on both sides of the boundary surfaces of the parting line of the plastic cage and thus form the fixation of the cage ends in the peripheral direction. At the same time, because the projections are arranged radially one above the other, the cage ends are fixed in the radial direction.

According to another aspect of the present disclosure, the axial width of the projections and that of the latches having the same axial width correspond to about one third of the length of the cage webs and that the distance between the projections at each boundary surface of the parting line is smaller than the axial width of the projections. While the cage ends are fixed in an axial direction by the axial extension of one latch connected to a tangential extension of the adjacent side ring, the distance between the projections, which is smaller than the axial width of the projections, ensures that unintentional opening of the cage is also ruled out in the other axial direction.

According to another aspect of the present disclosure, the radial height of the latches and the radial height of the projections each correspond to approximately one third of the radial height of the cage webs. This design has the result that the cage lock in the assembled state has the same overall height as the adjacent cage webs and that no overhangs occur that cause imbalances in the plastic cage due to centrifugal force.

According to another aspect of the present disclosure, the free ends of the latches and the free end of the axial extension of one latch are designed with insertion chamfers aligned with one another. The insertion chamfers serve to facilitate closing of the cage lock, in which the cage ends are pressed against one another. The insertion chamfers of the latches at one cage end slide over the insertion chamfers of the latches at the other cage end in such a way that the latches pivot upwards or downwards, using the elasticity of the cage material, until they finally engage one behind the other.

The plastic cage has the advantage that its cage lock is suitable for use on inner-ring-fastened roller sleeves with large diameters and narrow widths due to the use of projections with latches as locking elements.

BRIEF DESCRIPTION OF THE DRAWINGS

An embodiment of the plastic cage of the present disclosure is explained in more detail below with reference to the accompanying drawings. In the drawings.

DETAILED DESCRIPTION

Figure 1:
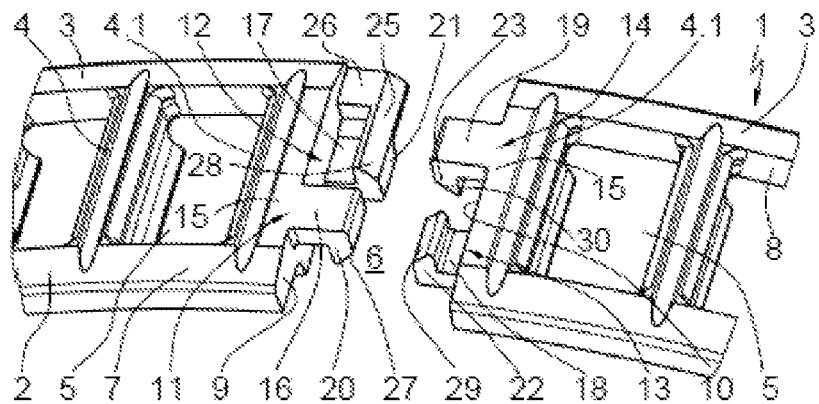
FIG. 1 shows an enlarged spatial representation of the two cage ends of a plastic cage.

FIG. 1 clearly shows a plastic cage 1 suitable for an inner-ring-fastened roller sleeve, which in a known manner consists of two side rings 2, 3 which have a common axis of rotation and are axially spaced apart from one another, and a plurality of cage webs 4 connecting the side rings 2, 3 to one another, between which pockets 5 are formed for receiving rolling elements, not shown. The plastic cage 1 is designed to be axially slotted at one peripheral location by a parting line 6, which defines a first and a second cage end 7, 8 and at the boundary surfaces 9, 10 of which mutually corresponding closure elements 11, 12, 13, 14 are arranged, with which the cage ends 7, 8 are fixed to each other both in the axial and radial direction and in the peripheral direction.

Figure 2:
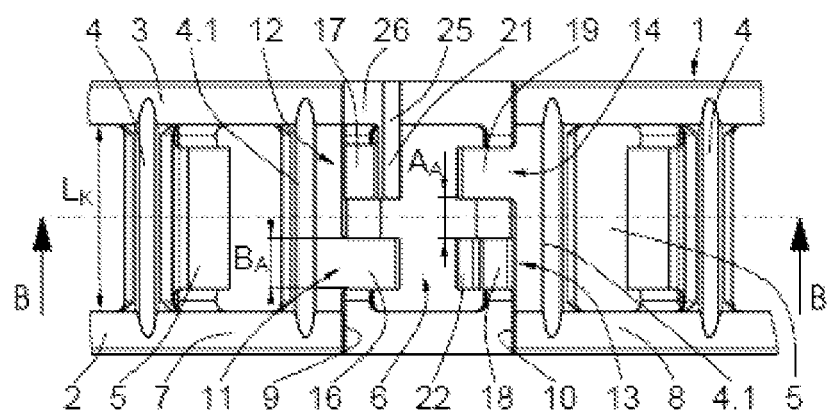
FIG. 2 shows an enlarged plan view of the two cage ends of the plastic cage.

It can also be seen in FIGS. 1 and 2 that the parting line 6 runs radially centrally through a tangentially widened cage web 4.1 and that the closure elements 11, 12, 13, 14 are each formed by a projection 16, 19 molded onto each boundary surface 9, 10 of the parting line 6 as an extension of the outer lateral surface 15 of the cage web 4.1 and axially spaced from the side rings 2, 3 with a latch 20, 23 which points radially inwards into the cage at its free end, to which a projection 17, 18 molded onto each boundary surface 9, 10 of the parting line 6 as an extension of the inner lateral surface 24 of the cage web 4.1 and also axially spaced from the side rings 2, 3 is assigned opposite it in the peripheral direction, with a latch 21, 22 pointing radially outwards from the cage at its free end. The latch 21 pointing outwards from the cage additionally has an axial extension 25 for fixing the cage ends 7, 8, in an axial direction, which is connected to a tangential extension 26 of the adjacent side ring 3.

Figure 3:
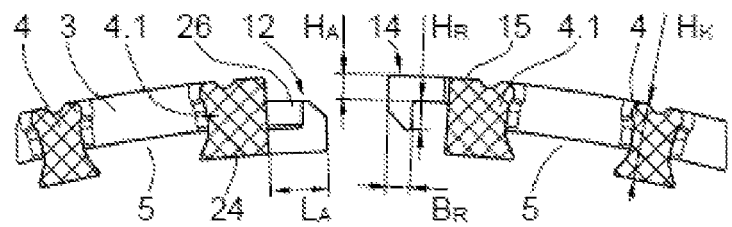
FIG. 3 shows a side view of the two cage ends of the plastic cage according to section B-B in FIG. 2.

Looking at FIGS. 1-3 together, it becomes clear that the projections 16, 17, 18, 19 at both boundary surfaces 9, 10 of the parting line 6 have a tangential length L A corresponding to at least twice the profile width B R of their latches 20, 21, 22, 23, in order to achieve fixation of the cage ends 7, 8 in the peripheral direction. At the same time, because the projections 16, 17, 18, 19 are arranged radially one above the other, the cage ends 7, 8 are fixed in the radial direction.

It can also be seen from FIGS. 1-3 that the axial width B A of the projections 16, 17, 18, 19 and that of the latches 20, 21, 22, 23 having the same axial width correspond to approximately one third of the length L K of the cage webs 4 and that the distance A A between the projections 16, 17, 18, 19 at each boundary surface 9, 10 of the parting line 6 is smaller than the axial width (B A) of the projections 16, 17, 18, 19, in order to thus achieve axial fixation of the cage ends 7, 8 in the other axial direction.

Finally, FIG. 3 also shows that the radial height H R of the latches 20, 21, 22, 23 and the radial height H A of the projections 16, 17, 18, 19 each correspond to approximately one third of the radial height H K of the cage webs 4, 4.1, so that the cage lock in the assembled state has the same overall height as the adjacent cage webs 4.1. The mutually facing insertion chamfers 27, 28, 29, 30 molded onto the free ends of the latches 20, 21, 22, 23 and onto the free end of the axial extension 25 of the latch 21 visible in FIG. 1 serve to facilitate closing of the cage lock.

LIST OF REFERENCE NUMERALS

1 Plastic cage
2 Side ring of 1
3 Side ring of 1
4 Cage webs
4.1 cage web with 6
5 Pockets
6 Parting line
7 First cage end
8 Second cage end
9 Boundary surface of 6
10 Boundary surface of 6
11 Closure element at 9
12 Closure element at 9
13 Closure element at 10
14 Closure element at 10
15 Outer lateral surface of 4.1

16 Projection at 9
17 Projection at 9
18 Projection at 10
19 Projection at 10
20 Latch at 16
21 Latch at 17
22 Latch at 18
23 Latch at 19
24 Inner lateral surface of 4.1
25 Axial extension at 21
26 Tangential extension of 3
27 Insertion chamfer at 20
28 Insertion chamfer at 21
29 Insertion chamfer at 22
30 Insertion chamfer at 23
$B_R$ Profile width of 20, 21, 22, 23
$L_A$ Tang. length of 16, 17, 18, 19
$H_A$ Radial height of 16, 17, 18, 19
$H_S$ Radial height of 2, 3
$B_A$ Axial width of 16, 17, 18, 19
$L_K$ Length of 4
$A_A$ Distance between 16, 17 and 18, 19
$H_R$ Radial height of 20, 21, 22, 23

The invention claimed is:

1. A plastic cage, comprising:
first and second side rings that are axially spaced apart from one another;
a plurality of cage webs that connect the side rings to one another and between which pockets are formed for receiving rolling elements;
a first cage end having a first closure element; and
a second cage end having a second closure element that corresponds with the first closure element, such that the first and second cage ends are operable to be selectively engaged such that the first and second closure elements limit movement of the first and second cage ends relative to each other in axial, radial, and tangential directions, wherein the first closure element comprises:
a first projection that extends from a boundary surface of the first cage end; and
a first latch that extends a first radial direction from the first projection to a first free end of the first latch that is distal from the first projection; and
wherein the second closure element comprises:
a second projection that extends from a boundary surface of the second cage end; and
a second latch that extends a second radial direction opposite the first radial direction from the second projection to a second free end of the second latch that is distal from the second projection, the second free end of the second latch having an axial extension that extends axially outboard to a tangential extension that extends to one of the first and second side rings therefrom.

2. The plastic cage of claim 1, wherein the first and second projections have tangential lengths that are at least twice the distance of profile widths of the first and second latches of the first and second closure elements, respectively.

3. The plastic cage of claim 1, wherein an axial width of at least one of the first and second projections corresponds to approximately one third of a length of the cage webs.

4. The plastic cage of claim 1, wherein radial heights of the first and second projections are about one third of a distance of radial heights of the cage webs.

5. The plastic cage of claim 1, wherein the first and second free ends of the first and second latches and the axial extension include insertion chamfers.

6. A cage for a bearing, comprising:
a first side ring and a second side ring in an axially-spaced relationship with the first side ring and connected therewith via a plurality of cage webs that define pockets for receiving roller elements therein;
a first cage end extending between the first and second side rings and having a first plurality of closure elements that protrude outward from a first boundary surface, wherein the first plurality of closure elements includes a first closure element, comprising:
a first projection molded onto the first boundary surface; and
a first latch that extends a first radial direction from the first projection to a first free end of the first latch; and
a second cage end extending between the first and second side rings and having a second plurality of closure elements that protrude outward from a second boundary surface, wherein the second plurality of closure elements includes a second closure element, comprising:
a second projection molded onto the second boundary surface; and
a second latch that extends a second radial direction opposite the first radial direction from the second projection to a second free end of the second latch, the free end of the second latch having an axial extension that extends axially outboard to a tangential extension that extends to one of the first and second side rings therefrom,
the first and second cage ends being operable between a disengaged condition, wherein the first plurality of closure elements are in a spaced relationship with the second plurality of closure elements such that a gap is defined between the first and second cage ends, and an engaged condition, wherein the first closure element is engaged with the second closure element, such that movement of the first and second cage ends in axial, radial, and peripheral directions is limited by contact between the first and second closure elements; and
wherein the first and second projections are positioned wholly axially inboard of the first and second side rings.

7. The cage of claim 6, wherein the first side ring, the second side ring, the plurality of cage webs, the first cage end, and the second cage end are formed of plastic.

8. The cage of claim 6, wherein the first and second side rings extend continuously from the first cage end to the second cage end.

9. The cage of claim 8, wherein the axial extension of the second free end is chamfered.

10. The cage of claim 6, wherein the first free end of the first latch extends radially inward from the first projection of the first closure element, and the second free end of the second latch extends radially outward from the second projection of the second closure element.

11. The cage of claim 6, wherein the tangential extension is configured to limit movement of the first cage end relative to the second cage end in the axial direction in the engaged condition of the first and second cage ends.

* * * * *